(12) United States Patent
Nakase

(10) Patent No.: US 8,446,653 B2
(45) Date of Patent: May 21, 2013

(54) IMAGE FORMING APPARATUS AND IMAGE FORMING METHOD WHICH PREVENT TONER FROM PEELING FROM A SECONDARY COLOR AREA OF A MULTICOLOR IMAGE WHILE THE IMAGE IS ON THE PHOTOSENSITIVE MEMBER OF THE APPARATUS

(75) Inventor: Takahiro Nakase, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 12/884,381

(22) Filed: Sep. 17, 2010

(65) Prior Publication Data

US 2011/0065031 A1 Mar. 17, 2011

(30) Foreign Application Priority Data

Sep. 17, 2009 (JP) ................................. 2009-215544

(51) Int. Cl.
*H04N 1/40* (2006.01)
*G06K 15/00* (2006.01)
*G03F 3/08* (2006.01)
*B41J 2/00* (2006.01)

(52) U.S. Cl.
USPC ........ 358/518; 358/3.01; 358/3.03; 358/3.06; 358/3.1; 347/188; 347/196

(58) Field of Classification Search
USPC ................ 358/518, 1.9, 3.01, 515, 3.06, 448, 358/1.1, 1.6, 3.03, 3.1, 504, 514, 540; 347/239, 347/111, 15, 3, 43, 1, 24, 47, 63, 171, 172, 347/175, 183, 188, 196, 232, 224; 355/32.35, 355/38, 83, 77, 78; 399/67, 68, 69, 49, 53, 399/298, 46, 71, 303, 331, 344, 363, 365; 382/164, 260, 286, 166, 237
See application file for complete search history.

(56) References Cited

U.S. PATENT DOCUMENTS

| 4,989,043 | A | * | 1/1991 | Suzuki et al. | 399/39 |
|---|---|---|---|---|---|
| 5,751,401 | A | * | 5/1998 | Takaoka et al. | 355/32 |
| 2003/0085941 | A1 | * | 5/2003 | Tezuka et al. | 347/19 |
| 2009/0073469 | A1 | * | 3/2009 | Kita et al. | 358/1.9 |

FOREIGN PATENT DOCUMENTS

JP 2004-181868 A 7/2004

* cited by examiner

*Primary Examiner* — Benny Q Tieu
*Assistant Examiner* — Ngon Nguyen
(74) *Attorney, Agent, or Firm* — Fitzpatrick, Cella, Harper & Scinto

(57) ABSTRACT

An image forming apparatus comprising an exposure device for exposing an image bearing member to light in accordance with monochromatic image data provided by color separation of inputted multi-color image data to form an electrostatic latent image; a control device for calculating an exposure amount of each pixel of the monochromatic image data to expose the image bearing member with the calculated exposure amount; wherein the control device includes a monochromatic correcting device for calculating a correction amount in accordance with a pixel value of a pixel around a target pixel of the monochromatic image data to correct an exposure amount of the target pixel on the basis of the calculated amount; wherein the control device includes a multi-color correcting device for providing a coefficient for correction of the exposure amount on the basis of the multi-color image data; wherein the monochromatic correcting device controls the exposure amount using the coefficient and the correction amount provided by the multi-color correcting device.

8 Claims, 15 Drawing Sheets

(a) IMAGE PATTERN

INTERSECTION (b) CROSS SECTION TAKEN ALONG BROKEN LINE IN (a)

(i) CORECTION OF M. EXP. AMOUNT ONLY

EASY TO REMOVE (ii) CORRECTION OF 4-CLR EXP. AMOUNTS

NOT EASY TO REMOVE (c) ENLARGED CROSS-SECTION OF THICK LINE (i) CORECTION OF M. EXP. AMOUNT ONLY

FRAGILE (ii) CORRECTION OF 4-CLR EXP. AMOUNTS

NOT FRAGILE (a) IMAGE PATTERN

← INTERSECTION (b) CROSS SECTION TAKEN ALONG BROKEN LINE IN (a)
 (i) NO CORECTION OF M. EXP. AMOUNT
 (ii) WITH CORRECTION
 EASY TO RMV (c) ENLARGED CROSS-SECTION OF THICK LINE
 (i) NO CORECTION OF M. EXP. AMOUNT
 (ii) WITH CORRECTION
 EASY TO RMV

TABLE 1

|  | 1.00 | 1.00 |  |  |
|---|---|---|---|---|
|  | 1.00 | 1.00 |  |  |
|  | 1.00 | 2.00 | 1.00 |  |
|  | 1.00 | 2.00 | 1.00 |  |
|  | 1.00 | 2.00 | 1.00 |  |
|  |  | 1.00 | 1.00 |  |
|  |  | 1.00 | 1.00 |  |

TABLE 2

(Cyan)

|  | 1.00 | 1.00 |  |  |
|---|---|---|---|---|
|  | 1.00 | 1.00 |  |  |
|  | 1.00 | 1.00 |  |  |
|  | 1.00 | 1.00 |  |  |
|  | 1.00 | 1.00 |  |  |
|  |  |  |  |  |
|  |  |  |  |  |

(Magenta)

|  |  |  |  |  |
|---|---|---|---|---|
|  |  |  |  |  |
|  |  | 1.00 | 1.00 |  |
|  |  | 1.00 | 1.00 |  |
|  |  | 1.00 | 1.00 |  |
|  |  | 1.00 | 1.00 |  |
|  |  | 1.00 | 1.00 |  |

TABLE 3

(Cyan)

|  | 1.00 | 1.00 |  |  |
|---|---|---|---|---|
|  | 1.00 | 1.00 |  |  |
|  | 1.00 | 1.00 |  |  |
|  | 1.00 | 1.00 |  |  |
|  | 1.00 | 1.00 |  |  |
|  |  |  |  |  |
|  |  |  |  |  |

Magenta

|  |  |  |  |  |
|---|---|---|---|---|
|  |  |  |  |  |
|  |  | 1.00 | 1.00 |  |
|  |  | 1.00 | 1.00 |  |
|  |  | 1.00 | 1.00 |  |
|  |  | 1.00 | 1.00 |  |
|  |  | 1.00 | 1.00 |  |

TABLE 4

| 1 | 1 | 1 |
|---|---|---|
| 1 | 1 | 1 |
| 1 | 1 | 1 |

Fig. 14

TABLE 5

(Cyan)

| | 1.20 | 1.20 | | |
|---|---|---|---|---|
| | 1.20 | 1.20 | | |
| | 1.20 | 1.20 | | |
| | 1.20 | 1.20 | | |
| | 1.33 | 1.33 | | |
| | | | | |
| | | | | |

(Magenta)

| | | | | |
|---|---|---|---|---|
| | | | | |
| | | 1.33 | 1.33 | |
| | | 1.20 | 1.20 | |
| | | 1.20 | 1.20 | |
| | | 1.20 | 1.20 | |
| | | 1.20 | 1.20 | |

TABLE 6

| | 1.20 | 1.20 | | |
|---|---|---|---|---|
| | 1.20 | 1.20 | | |
| | 1.20 | 2.53 | 1.33 | |
| | 1.20 | 2.40 | 1.20 | |
| | 1.33 | 2.53 | 1.20 | |
| | | 1.20 | 1.20 | |
| | | 1.20 | 1.20 | |

TABLE 7

| 0 | 0 | 0 | 0 | 0 |
|---|---|---|---|---|
| 0 | 0 | 0 | 0 | 0 |
| 0 | 0 | 1 | 0 | 0 |
| 0 | 0 | 1 | 0 | 0 |
| 0 | 0 | 1 | 0 | 0 |
| 0 | 0 | 0 | 0 | 0 |
| 0 | 0 | 0 | 0 | 0 |

TABLE 8

| 1 | 1 | 1 |
|---|---|---|
| 1 | 0 | 1 |
| 1 | 1 | 1 |

Fig. 15

TABLE 9

| -0.25 | 0.58 | 0.58 | -0.25 | 0.00 |
|---|---|---|---|---|
| -0.33 | 0.25 | 0.08 | -0.58 | -0.08 |
| -0.33 | 0.08 | 0.92 | 0.25 | 0.25 |
| -0.33 | 0.00 | 0.67 | 0.00 | -0.33 |
| -0.25 | 0.25 | 0.92 | 0.08 | -0.33 |
| -0.08 | -0.58 | 0.08 | 0.25 | -0.33 |
| 0.00 | -0.25 | 0.58 | 0.58 | -0.25 |

TABLE 10

(Cyan)

|  | 1.33 | 1.33 |  |  |
|---|---|---|---|---|
|  | 1.20 | 1.20 |  |  |
|  | 1.20 | 0.93 |  |  |
|  | 1.20 | 1.00 |  |  |
|  | 1.33 | 1.03 |  |  |
|  |  |  |  |  |
|  |  |  |  |  |

(Magenta)

|  |  |  |  |  |
|---|---|---|---|---|
|  |  |  |  |  |
|  |  | 1.03 | 1.33 |  |
|  |  | 1.00 | 1.20 |  |
|  |  | 0.93 | 1.20 |  |
|  |  | 1.20 | 1.20 |  |
|  |  | 1.33 | 1.33 |  |

TABLE 11

|  | 1.33 | 1.33 |  |  |
|---|---|---|---|---|
|  | 1.20 | 1.20 |  |  |
|  | 1.20 | 1.95 | 1.33 |  |
|  | 1.20 | 2.00 | 1.20 | ★ |
|  | 1.33 | 1.95 | 1.20 | ★ |
|  |  | 1.20 | 1.20 | ★ |
|  |  | 1.33 | 1.33 |  |

TABLE 12

(Original)

| 2.00 | 2.00 | 2.00 | 2.00 |  |
|---|---|---|---|---|
| 2.00 | 2.00 | 2.00 | 2.00 |  |
| 2.00 | 2.00 | 2.00 | 2.00 |  |
| 2.00 | 2.00 | 2.00 | 2.00 |  |
| 2.00 | 2.00 | 2.00 | 2.00 |  |
| 2.00 | 2.00 | 2.00 | 2.00 |  |
| 2.00 | 2.00 | 2.00 | 2.00 |  |

(Cyan)

| 1.00 | 1.00 | 1.00 | 1.00 |  |
|---|---|---|---|---|
| 1.00 | 1.00 | 1.00 | 1.00 |  |
| 1.00 | 1.00 | 1.00 | 1.00 |  |
| 1.00 | 1.00 | 1.00 | 1.00 |  |
| 1.00 | 1.00 | 1.00 | 1.00 |  |
| 1.00 | 1.00 | 1.00 | 1.00 |  |
| 1.00 | 1.00 | 1.00 | 1.00 |  |

(Magenta)

| 1.00 | 1.00 | 1.00 | 1.00 |  |
|---|---|---|---|---|
| 1.00 | 1.00 | 1.00 | 1.00 |  |
| 1.00 | 1.00 | 1.00 | 1.00 |  |
| 1.00 | 1.00 | 1.00 | 1.00 |  |
| 1.00 | 1.00 | 1.00 | 1.00 |  |
| 1.00 | 1.00 | 1.00 | 1.00 |  |
| 1.00 | 1.00 | 1.00 | 1.00 |  |

Fig. 16

TABLE 13

WITHOUT 2RY CORRECTION

| 2.67 | 2.40 | 2.40 | 2.67 |
|---|---|---|---|
| 2.40 | 2.00 | 2.00 | 2.40 |
| 2.40 | 2.00 | 2.00 | 2.40 |
| 2.40 | 2.00 | 2.00 | 2.40 |
| 2.40 | 2.00 | 2.00 | 2.40 |
| 2.40 | 2.00 | 2.00 | 2.40 |
| 2.67 | 2.40 | 2.40 | 2.67 |

WITH 2RY CORRECTION

| 1.89 | 2.00 | 2.00 | 1.89 |
|---|---|---|---|
| 2.00 | 2.00 | 2.00 | 2.00 |
| 2.00 | 2.00 | 2.00 | 2.00 |
| 2.00 | 2.00 | 2.00 | 2.00 |
| 2.00 | 2.00 | 2.00 | 2.00 |
| 2.00 | 2.00 | 2.00 | 2.00 |
| 1.89 | 2.00 | 2.00 | 1.89 |

TABLE 14

| 0.5 | 0.5 | 0.5 | 0.5 | 0.5 |
|---|---|---|---|---|
| 0.5 | 1.0 | 1.0 | 1.0 | 0.5 |
| 0.5 | 1.0 | 0.0 | 1.0 | 0.5 |
| 0.5 | 1.0 | 1.0 | 1.0 | 0.5 |
| 0.5 | 0.5 | 0.5 | 0.5 | 0.5 |

Fig. 17

IMAGE FORMING APPARATUS AND IMAGE FORMING METHOD WHICH PREVENT TONER FROM PEELING FROM A SECONDARY COLOR AREA OF A MULTICOLOR IMAGE WHILE THE IMAGE IS ON THE PHOTOSENSITIVE MEMBER OF THE APPARATUS

FIELD OF THE INVENTION AND RELATED ART

The present invention relates to an image forming apparatus, such as laser beam printer, which forms an image on a photosensitive member by scanning (exposing) the photosensitive member with a beam of light, and an image forming method which forms an image on a photosensitive member by scanning (exposing) the photosensitive member with a beam of light. In particular, it relates to a technology for correcting the amount by which a photosensitive member is exposed.

The amount by which toner is adhered to various points (equivalent to pixels) of the surface of an image bearing member of an electrophotographic image forming apparatus to develop an electrostatic latent image on the image bearing member is affected not only by the amount of the electric charge of each of these points, but also, by the amount of electric charge of the adjacent points. Therefore, even if two points (pixels) which are to be equal in terms of image density after development sometimes will be different in the amount by which toner is adhered thereto, causing thereby an image forming apparatus to output an image which is different in image density and pattern from an intended image. In particular, in a case where an image which has isolated dots, isolated fine lines, and dot clusters, is formed, the isolated dots, the dots of the isolated fine lines, and the dots of the dot cluster, are different in the amount by which each dot (equivalent to pixel) is affected by the adjacent dots as it is formed. Therefore, it has been sometimes impossible to output an image which is satisfactory in all of the isolated dots, isolated fine lines, and dot clusters, which made up the image. There are various methods for preventing the occurrence of this problem. One of them is to increase the amount by which each point (equivalent to pixel) of the image bearing member is exposed, in such a manner that the development electric field which will be generated as the portion of the photosensitive member, which corresponds to each dot (1 pixel×1 pixel) is exposed, will be greater. With the increase in the amount by which the portion of the photosensitive member, which corresponds to each dot, each dot will be satisfactorily and reliably outputted. This method, however, creates the following problem. That is, in each of the portions of the photosensitive member, which corresponds to the area of an intended image, which is made up of a cluster of dots, a given point (pixel), to which toner is to be adhered, is surrounded by the points (pixels) to which toner is also to be adhered. Therefore, the given point (pixel) will become excessive in the strength of development electric field. Thus, as it is developed, it will become greater in diameter (size) than it should be. That is, a conventional method used for exposing an image bearing member suffers from the problem that its usage makes it difficult to output an image which is satisfactory across both the area made up of relatively isolated dots, but also, the area made up relatively clustered dots.

A high resolution image is smaller in pixel size, and also, smaller in the distance between two adjacent pixels than a low resolution image. Therefore, the above described problem is more conspicuous in the case of a high resolution image than in the case of a low resolution image. In consideration of the effects of the distribution of electric charge in the adjacencies of a give point of an image bearing member, upon the manner in which toner (developer) will be adhered to this point, it is possible to formulate equations which show the physical relationship among the steps in an electrophotographic development process, and solve in steps the equations, in order to correct the image formation process. This method is problematic in that it requires a computation circuit which is very high in capacity. Japanese Laid-open Patent Application 2004-181868 (Document 1) solves this as follows. That is, assuming that a given point of a given area of an image is exposed, and the given area is equivalent in size to an area of an electrostatic latent image to be formed, which is N×M pixels of the image to be formed, the image forming apparatus disclosed in this application is designed to control the amount by which the given point will be exposed, in such a manner that if the give point is small in the number of the adjacent points to which toner will be adhered, it will become stronger in the electric field for adhering toner thereto than it will be if a conventional exposing method is used, whereas if the given point is large in the number of adjacent points to which toner is to be adhered, it will become weaker in the electric field for adhering toner thereto.

However, the usage of the method disclosed in Document 1 sometimes allows toner to peel in the transfer portion and/or fixing portion of the image forming apparatus, which results in the outputting of a print, some of the line of which are missing, and/or some halftone portions of which appears coarse because toner is missing therefrom by a microscopic amount. This phenomenon occurs for the following reason. That is, referring to FIG. 13(*a*), in the case of an image in which a fine line of one of the primary color intersects with a fine line of another primary color, the two fine lines formed by exposing the corresponding portions of two image bearing members by an amount corrected to better reproduce the fine line overlap with each other. Thus, the portion of the image, which corresponds to the intersection of the two fine lines, is larger, as shown in FIG. 13 (*b*)(i), in the amount of the toner adhered thereto, compared to when the method which does not correct the amount by which the photosensitive member is exposed is used. Thus, toner is likely to peel from this portion of the image, that is, the intersection of the two fine lines, that is, the portion of the secondary color (as indicated by arrow mark in FIG. 13(*b*)(ii)). Next, referring to FIG. 13(*c*)(ii), also in the case where the amount by which the photosensitive member is to be exposed (which hereafter may be referred to simply as exposure amount) is corrected, the toner layer which makes up the bold line is more likely to crumble across the edge portion, compared to the case, shown in FIG. 13(*c*), in which the exposure amount is not corrected. This phenomenon is likely to occur more often across a portion of an image, which corresponds to the intersection of toner layers than across a portion of an image, which is made up of a single toner layer. In other words, this phenomenon is likely to occur more often to a secondary color portion of a toner image. Incidentally, in FIG. 13, the difference in color is shown by the difference in tone.

FIG. 13(*d*) is a graph which shows the relationship between the dot count and the ratio of the actual amount by which toner was adhered to a photosensitive member (recording medium) relative to the ideal amount by which toner is to be adhered to the photosensitive member (recording medium) when forming a dot which is equivalent in size to N×M pixels. As for the amount by which toner is adhered to an image bearing member to form an image which is small in dot diameter, the greater the amount by which toner is adhered to a given point (pixel) of the image bearing member, compared to the amount by which toner is adhered to the adjacent points (pixels), the smaller. That is, paying attention to an image which is small in dot diameter, the ratio of the amount by which toner is actually adhered to an image bearing member, relative to the ideal amount is smaller in a case where the difference between the amount by which toner is adhered to the target point (pixel) of the image bearing member and the amount by which toner is adhered to the adjacent points (pixel) is large (broken line in FIG. 13(d)), than in a case where it is small (solid line FIG. 13(d)). That is, toner is more likely to peel in the former case. If the amount of the toner adhered to the photosensitive member (recording medium) is excessive, transfer failure, that is, the problem that the toner on the photosensitive member fails to be transferred in entirety, and/or fixation failure, that is, the problem that the toner on recoding medium fails to be fixed to the recording medium in entirety, occurs. As one of the means for dealing with this problem, it is possible to use the following control when forming a halftone area of an image, which is of a certain size (for example, area made up of 100×100 pixels), assuming that the amount, in terms of percentage, by which toner is adhered to an image bearing member to form a solid monochromatic image is 100%. That is, during the color matching process, Y (yellow), M (magenta), and C (cyan) are partially switched to K (black) to reduce the total amount by which toner is adhered to the image bearing member, to roughly 240%. "240%" is such a percentage that as long as the amount of toner on a given point (microscopic area) of the photosensitive member or recording medium is no more than 240%, the toner on this point is unlikely to fail to be transferred in entirety and/or to be fixed in entirety. It does not mean that if this method is used, the amount by which toner is adhered to each point (equivalent to pixel) of the photosensitive member (recording medium) becomes 240%. That is, it is only across certain halftone areas that toner will be adhered by 240%. Thus, it is possible that there will be some areas to which toner will be adhered by 300% or 200%. Therefore, this method cannot deal with the problem that toner is adhered by an excessive amount to certain areas of the photosensitive member (recording medium), which are of a microscopic size, for example, size equivalent to a single pixel. More concretely, even if the amount of the toner on the photosensitive member is no more than 240% of the ideal amount from the macroscopic terms, it is possible that toner will peel at the border between a primary color area and a secondary color area, where a step is present between the two areas, when the unfixed multicolor image is in the transfer portion and/or fixing portion. This phenomenon is more likely to occur to an area of an image, which is made up of fine lines or the like, that is, where long and narrow toner layers are isolated from the other toner layers of the image, than the solid area of the image.

SUMMARY OF THE INVENTION

The present invention was made in consideration of the above-described problems.

It is a primary object is to provide a combination of an image forming apparatus and an image forming method, which prevents toner from peeling from a secondary color area of a multicolor image while the image is on the photosensitive member of the apparatus, and/or recording medium, during the formation of the image, and yet, is superior in terms of the reproducibility of fine lines.

According to an aspect of the present invention, there is provided an image forming apparatus comprising exposure means for exposing an image bearing member to light in accordance with monochromatic image data provided by color separation of inputted multi-color image data to form an electrostatic latent image; control means for calculating an exposure amount of each pixel of the monochromatic image data to expose the image bearing member with the calculated exposure amount; wherein said control means includes monochromatic correcting means for calculating a correction amount in accordance with a pixel value of a pixel around a target pixel of the monochromatic image data to correct an exposure amount of the target pixel on the basis of the calculated amount; wherein said control means includes multi-color correcting means for providing a coefficient for correction of the exposure amount on the basis of the multi-color image data; wherein said monochromatic correcting means controls the exposure amount using the coefficient and the correction amount provided by said multi-color correcting means.

These and other objects, features, and advantages of the present invention will become more apparent upon consideration of the following description of the preferred embodiments of the present invention, taken in conjunction with the accompanying drawings.

BRIEF DESCRIPTION OF THE DRAWINGS

FIG. 14 shows Tables 1-4.
FIG. 15 shows Tables 5-8.
FIG. 16 shows Tables 9-12.
FIG. 17 shows Tables 13 and 14.

DETAILED DESCRIPTION OF THE PREFERRED EMBODIMENTS

Hereinafter, the preferred embodiments of the present invention will be described with reference to the appended drawings. Incidentally, in a case where a given component, portion, etc., in one of the appended drawings has the same referential code as the component, portion, etc., in another of the appended drawings, they are the same in structure and function, and therefore, they will be described only once.

Embodiment 1

Detailed Description of Multifunction Image Forming Apparatus

Figure 1:
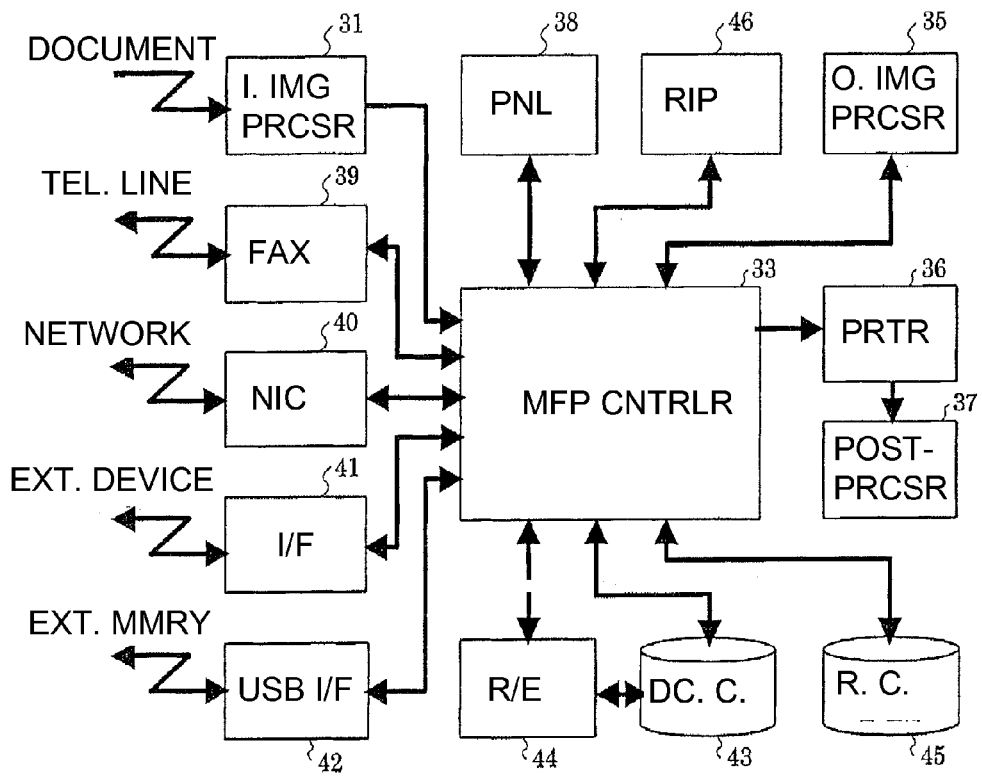
FIG. 1 is a detailed block diagram of the electrophotographic multifunction image forming apparatus in the first and second preferred embodiments of the present invention.

First, referring to FIG. 1, the structure of the electrophotographic multifunction image forming apparatus in this embodiment will be described. FIG. 1 is a drawing for describing the structure of the electrophotographic multifunction image forming apparatus. The multifunction image forming apparatus has an internal memory such as a hard disc capable of storing multiple job data. It is also capable of functioning as a copying machine which uses the printing portion 36 of the apparatus to output copies of an original, through the above-mentioned memory of the apparatus, into which the data of the original image was inputted and stored through the scanner portion of the apparatus. The electrophotographic multifunction image forming apparatuses can be categorized into a monochromatic group and a full-color group, which are virtually the same in basic structure and components, although they are different in color data processing function, internal data storage, and the like. Thus, most of full-color image forming apparatuses are capable of functioning as a monochromatic image forming apparatus. Hereafter, therefore, the present invention will be described with reference to primarily electrophotographic multifunction image forming apparatuses, while describing electrophotographic monochromatic image forming apparatus as necessary. Regarding the structure of the system to which the present invention is applicable, not only is the present invention applicable to electrophotographic multifunction image forming apparatuses, but also, image forming apparatuses having only a single function, for example, the printing function. Incidentally, SFP stands for "Single Function Peripheral".

Referring to FIG. 1, the multifunction image forming apparatus has: a data processing portion 31 which reads the image on a sheet of paper or the like, and which processes the data (in the form of electrical signals) obtained by reading the image; a facsimile portion 39 which sends and receives images with the use of a telephone lines; a NIC 40 (Network Interface Card) which exchanges image data, apparatus information, etc., with the use of a network; an interface 41 dedicated to exchange of information, such as image data, between the apparatus and external apparatuses (devices); and a USB interface 42 (USB I/F) through which the image forming apparatus transmits or receives data, such as image data, to or from, external memories which include USB (Universal Serial Bus) devices, for example, USB memories (removable memories). The image data processing portion 31 is in the form of a scanner having an ADF (automatic document feeder). The controller 33 controls various operations, for example, temporarily storing the data to be used by the multifunction image forming apparatus, determining the data transfer path, and the like operations.

The document control portion 43 has a memory such as a hard disc capable of storing multiple image data. For example, the controller (for example, CPU of controller 33, memory (RAM, ROM)) primarily controls image data of various types, so that the data can be stored in the document storage portion 43. Examples of various image data are: image data from the image data processing portion 31; image data inputted through the facsimile portion 39; image data inputted from the external apparatuses through the NIC 40, dedicated I/F 41, and USB I/F. The controller 33 reads the image data in the document control portion 43 as necessary, transfers the image data to image outputting portions such as a printer portion 36, and controls the printer portion 36 so that the printer portion 36 can output images, based on the data sent to the printer portion 36; reads the image data in the document control portion 43 in response to an instruction (command) inputted by an operator through the control panel of the multifunction image forming apparatus, and controls the data so that the data can be transferred to external apparatuses, such as a computer and another image forming apparatus, through a network. When it is necessary for image data to be stored in the document control portion 43, the controller 33 controls: the process of compressing, as necessary, the image data and storing the image data; process of decompressing the image data when reading the compressed image data in the document control portion 43; and the like processes, through the compressing/decompressing portion 44. It has been known that when the image data needs to be transmitted through a network, the image data is compressed in the JPEG, JBIG, ZIP, and the like formats. When the image data inputted into the image forming apparatus is in one of the above-mentioned formats, it is decompressed by the compressing/decompressing portion 44.

The resource control portion 45 stores fonts, color profiles, various parameter tables, such as a gamma table, which can be similarly handled. It is designed so that the fonts, color profile, parameter tables, etc., can be recalled as necessary. The resource control portion 45 can also store and recall new parameter tables.

As a PDL data is inputted into the image forming apparatus, the controller 33 processes the PDL data with the use of RIP 46, and/or image processing portion 35, so that the intended images can be printed. The intermediary data and/or print-ready data (bit map data for printing, and data obtained by compressing the bit map data) can be stored again in the document control portion 43 as necessary. Incidentally, PDL is an abbreviation of Page Description Language, and RIP is an abbreviation of Raster Image Processor. After the image data are processed as described above, they are sent from the controller 33 to the printer portion 36 which forms images (outputs copies). After copies are discharged from the printing portion 36, they are sent into the post-processing portion 37, in which they are sorted and/or subjected to final processing.

The controller 33 plays the role of facilitating the flow of the data of a printing job. More specifically, it selects a proper data path, depending on which of the various functions (A-N), given below, of the multifunction image forming apparatus is used. It has been known that the controller 33 stores the image data, in the form of intermediary data, as necessary. However, accesses other than the one which starts at the document control portion 43 and ends also at the document control portion 43 will not be described. Further, the processes carried out by the compressing/decompressing portion 44 and post-processing portion 37, which are used as necessary, and the processes carried out by the controller 33, will not be described. The functions, listed below, which the multifunction image forming apparatus in this embodiment is capable of performing, will be described just enough for the general flow of the image data to be understandable.

A) Copy function: input image data processing portion 31→output image data processing portion 35→printing portion 36

B) Facsimile transmitting function: input image data processing portion 31→facsimileing portion 39

C) Facsimile receiving function: facsimileing portion 39→output image data processing portion 35→printing portion 36

D) Network scan: input image data processing portion 31→NIC 40

E) Network print: NIC 40→RIP 46→output image data processing portion 35→printing portion 36

F) Scanning into external apparatus: input image data processing portion 31→dedicated I/F portion 41

G) Printing based input data from external apparatus: dedicated I/F portion 41→RIP 46→output image data processing portion 35→printing portion 36

H) Scanning into external memory: input image data processing portion 31→USB I/F portion 42

I) Printing based on input data from external memory: USB I/F portion 42→RIP 46→output image processing portion 35→printing portion 36

J) Box scanning function: input image processing portion 31→output image data processing portion 35→document controlling portion 43

K) Box printing function: document controlling portion 43→printing portion 36

L) Box receiving function: NIC 40→RIP 46→output image data processing portion 35→document controlling portion 43

M) Box transmitting function: document control portion 43→NIC 40

N) Previewing function: document control portion 43→control panel 38

In addition to the functions listed above, e-mail service function, web service function, to begin with, and various combinations among the above listed functions, are thinkable. However, the description of these functions will be reluctantly omitted. Further, among the functions A)-N) listed above, J) Box scanning function, K) Box printing function, L) Box receiving function, and M) Box transmitting function, are such functions of the image forming apparatus that involve the data writing and data reading which use the document controlling portion 43. These data processing functions are such functions that classify image data according to job type, user name, etc., and temporarily store the data in the separate portions of the document controlling portion 43, or output the data in response to a command which includes a user identification, a password, or their combination.

The control panel 38 is for making selection among the various data flows and functions listed above, and/or to input operational commands. Incidentally, with the increase in resolution of the display of the control panel, it has become possible for an operator to preview, for confirmation, the images, which will be outputted based on the image data in the document control portion 43, before inputting a print command.

[Structure of Controller]

Figure 2:
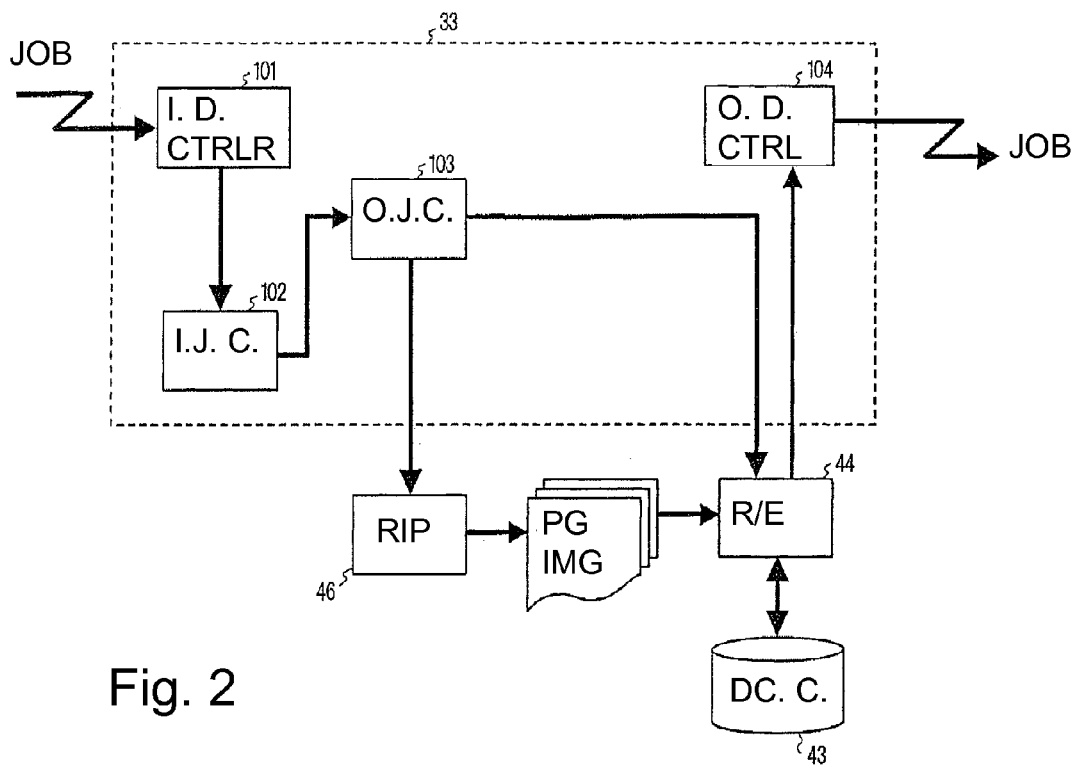
FIG. 2 is a block diagram of the control portion of the electrophotographic multifunction image forming apparatus in the first and second preferred embodiments of the present invention, and depicts the structure of the control portion.

Next, referring to FIG. 2, the structure of the controller 33 of the multifunction image forming apparatus will be described in detail. FIG. 2 is a detailed block diagram of the controller portion of the multifunction image forming apparatus in this embodiment, and shows the structure of the controller portion. The controller 33 in FIG. 2 is made up of roughly four sections, more specifically, an input device control portion 101 which controls input devices; an input job control portion 102 which interprets an inputted job; an output job control portion 103 which rearranges the information regarding various settings for the job; and an output device control portion 104 which directs the image data flow to an appropriate output device. The input device control portion 101 performs such operations as sorting the signals inputted from various input portions (input devices) of the multifunction image forming apparatus, and determining the order in which the devices are selected. The input portions means various structural components which input signals into the controller 33 by being connected to the controller 33. The input device control portion 101 receives input signals through the various input portions. Some input signals are external signals, that is, signals inputted from outside the multifunction image forming apparatus, for example, image data signals generated by scanning an original which is in the form of a sheet of paper, and PDL data signals from a network. The input signals include also the signals originating from the image data in the document control portion 43 and the image data processed by the combination of the RIP 46 and output image data processing portion 35.

The input job control portion 102 receives the series of operational demands sent from the input device control portion 101, in the form of command (protocol) signals. Then, it interprets the gist of the operational commands, and converts them into operational steps which can be understood within the main assembly of the multifunction image forming apparatus. The input job control portion 102 generates various jobs, for example, a printing job, a scanning job, a PDL developing job, a facsimile receiving job, etc. The generated jobs are given a scenario which defines how they are to be processed in the main assembly, where they are to be sent, etc., and then, are flowed through the main assembly based on the scenario.

The output job control portion 103 produces information regarding various settings (which are frequently referred to as "job tickets" in the field of image forming apparatus) and image information. The output job control portion 103 analyzes the information regarding the setting for the entirety of each job, for example, the name of the document to be printed, number of copies to be printed, designation of delivery tray, and order in which two or more sheets of paper are to be bound. It also analyzes the details of settings for binding process, for example, the method to be used by the post-processing portion 37 to bind a document having two or more sheets of paper, staple position, order in which two or more documents are to be bound; order in which the sheets of paper, on which document were printed, are arranged; whether a document is to be printed on both surface of each sheet of paper or not; whether or not a front and/or back cover page is attached (document setting); resolution; image positioning (landscape or portrait) (page settings). In addition, in a case where PDL data is inputted, the output job control portion 103 calls on RIP 46 to rasterize the data. Incidentally, the page settings need to be generated, the RIP 46 is called upon, and are generated by rasterization. The page settings are compressed by the compressing/decompressing portion 44, and then, are stored in the document control portion 43 while being coordinated with various settings other than the page settings. The page settings in the document control portion 43 are decompressed by the compressing/decompressing portion 44, and are read out together with the various settings correlated with the page settings. Then, the various settings other than the page settings, and the page settings, are transmitted in pairs to the output device control portion 104.

The output device control portion 104 assigns an appropriate output device to each job, based on the defined scenario for each job. However, in a case where multiple jobs are simultaneously processed, the jobs compete for the output portion (output devices). Thus, the output device control portion 104 arbitrates the competition. Further, it schedules the usages of the outputting portions, such as the printing portion 36 and post-processing portion 37.

[Structure of RIP]

Figure 3:
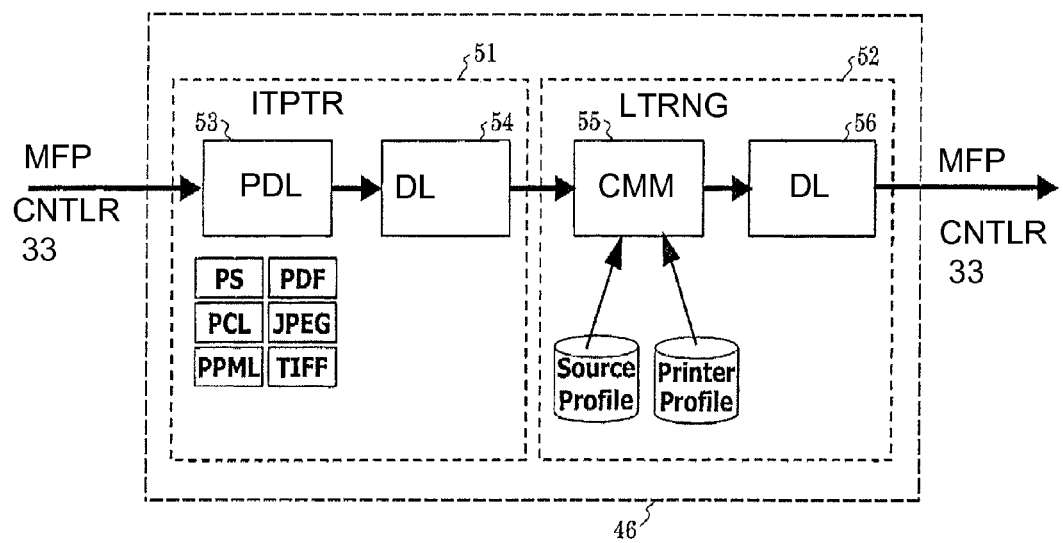
FIG. 3 is a block diagram of an example of the RIP (Raster Image Processor) of the preferred embodiments of the present invention, and depicts the structure of the RIP.

Next, referring to FIG. 3, the RIP will be described about its structure. The RIP is a processor for developing the information of the letters in the PDL format, line drawings, vectorial information of figures, colors, patterns, photographs, etc., into a bit map, in the memory, in order to reproduce them on the same page. The RIP used to be a part of the hardware of an image outputting apparatus. Recently, however, it is in the form of software, because of the increase in the CPU speed. Generally, RIP 46 is made up of two sections, more specifically, an interpreter section 51 and a rendering section 52. The interpreter section 51 has a PDL interpreting portion which interprets PDL data, and a DL (Display List) generating portion 54 which generates intermediary files (which are referred to as display list) from the interpreted PDL data. The rendering portion 52 has a CMM 55 (Color Matching Module) which matches the display list with color selection, and a DL development portion 56 which develops the display list into a bit map (rasterized image data).

The PDL interpreter portion 53 is a portion which analyzes various PDL data as they are inputted. As the format in which the PDL data are inputted, Post-Scrip (registered trade mark) language of Adobe Co., Ltd., PCL (Printer Control Language) of HP (Hewlett-Packard Co., Ltd., are famous. These languages are recorded in the form of printer control codes for forming an image for each page, and include simple character codes, picture drawing codes, photographic image codes, etc. Further, PDF (Portable Document Format), which is a document display file format developed by Adobe Co., Ltd., has been widely used in various fields. The data which is in this format which can be directly inputted into the multifunction image forming apparatus also can be interpreted by the PDL interpreter portion 53. Moreover, it is compatible with the format for VDP (Variable Data Print) which is called PPML (Personalized Print Markup Language), and color image compression formats which are called JPEG (Joint Photographic Experts Group), TIFF (Tagged Image File Format), etc.

The CMM portion 55 is capable of inputting various image data expressible in the well-known color space, such as RGB, CMYK, and the like. If the color space of the image data is other than RGB, CMYK, the CMM portion 55 converts this color space into the CMYK space with the use of CRD (Color Rendering Dictionary), and then, carries out the color matching operation. The CMM portion 55 makes color correction based on an ICC profile, which is made up of a source profile and a printer profile. A source file is used to convert RGB (CMYK) data into the standardized L*a*b* space, and then, converts the L*a*b* data which is suitable for the target printer. A source file is made up of a RGB profile and a CMYK profile. If the inputted image data is of the RGB type, the RGB profile is selected, whereas if it is of the CMYK type, the CMYK profile is selected.

A printer profile is made so that it matches with each printer in terms of color properties. If the inputted image data is of the RGB type, the printer profile is desired to be generated so that perceptual and saturation are prioritized. If the inputted image data is of the CMYK type, selecting colorimetric as printer profile is common practice in order to output optimal images. Further, ICC profile is in the form of a lookup table. As RGB data (or CMYK data) is inputted, the source profile is simply converted into L*a*b* data. On the other hand, the printer file is converted from L*a*b* file into CMYK data which matches the printer properties. Incidentally, the RGB data which does not require color matching is converted into CMYK data through the default color conversion, and then, is outputted. The CMYK data which does not require color matching is outputted as it is. It is assumed here that the amount, in terms of percentage, by which toner is adhered to an image bearing member to form a solid monochromatic image is 100%. In the case of the printer profile, if the data of an image made up of solid monochromatic images of C, M, Y, and K colors, respectively, is inputted, the YMC data is sometimes subjected to such control that partially converts the YMC data into K data to reduce the maximum amount by which toner is adhered to image bearing member, to 240%. The data developed in the RIP 46 is stored in the document control portion 43 through the compressing/decompressing portion 43.

[Structure of Image Data Processing Portion]

Figure 4:
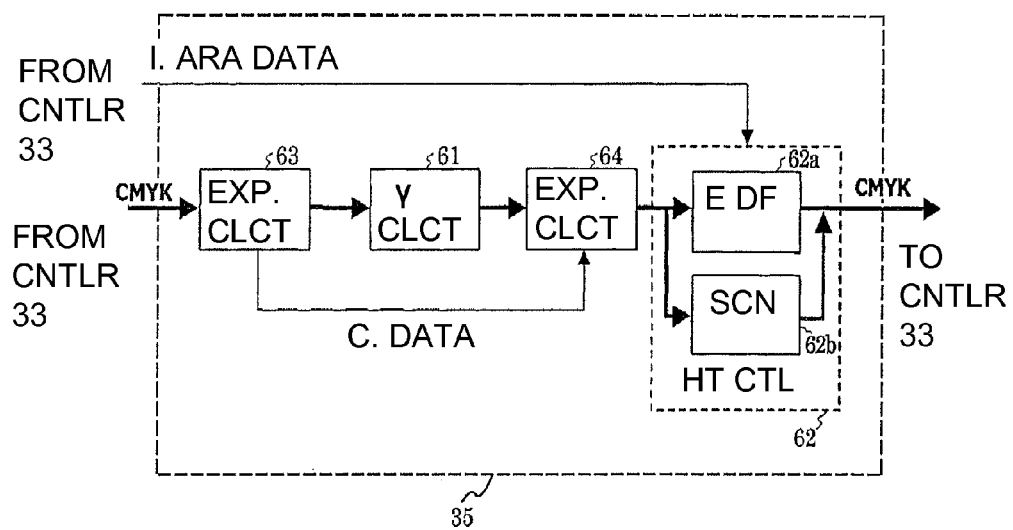
FIG. 4 is a block diagram of the image processing portion of the image forming apparatus in the first preferred embodiment, and depicts the structure of the image processing portion.

Next, referring to FIG. 4, the image data processing portion 35 will be described. As the image data is inputted into the image data processing portion 35 (color image data processing portion), it is put through an overall exposure amount correcting portion 63, a gamma correction portion 61, an individual exposure amount correcting portion 64, and a halftone processing portion 62, in the listed order. The overall exposure amount correcting portion 63 and individual exposure amount correcting portion 64 will be described later in detail. The image data to be inputted into the image data processing portion 35 (color image data processing portion) can be roughly divided into a RGB group and a CMYK group. An RGB data is such a data that is outputted from the image data processing portion 31 for a copying operation or the like, whereas a CMYK data is such a data that is outputted from the RIP 46 for printing images from a network. In the case of the former, the portion of the data, which corresponds to back ground, is removed by the output image data processing portion 35, and then, is inputted into the overall exposure amount correcting portion 63. In the gamma correcting portion 61, it is corrected in density so that it becomes compatible with the properties of the output portion (for example, printing portion 36). The gamma correcting portion 61 plays the role of keeping linear the relationship among the data of the image to be outputted, since no two image forming operations are the same in image data. Generally speaking, color calibration is affected by the lookup table.

The halftone processing portion 62 is enabled to select one of various screens according to the properties of the multifunction image forming apparatus. Generally, in the case where the multifunction image forming apparatus is in the copy mode, an error dispersion screen, which minimizes the occurrence of moire, is used (by error dispersing portion 62a). In the case where the multifunction image forming apparatus is in the printing mode, a multi-value screen, based on dither matrix, is used (by multi-value screening portion 62b), in order to satisfactorily reproduce letters and fine lines. The former is such a method that a target pixel and adjacent pixels are weighted with the use of an error correction filter to make correction by distributing errors over adjacent area. The latter is such a method that falsely creates fake halftone level by setting multiple threshold values.

[Structure of Multifunction Image Forming Apparatus]

Figure 5:
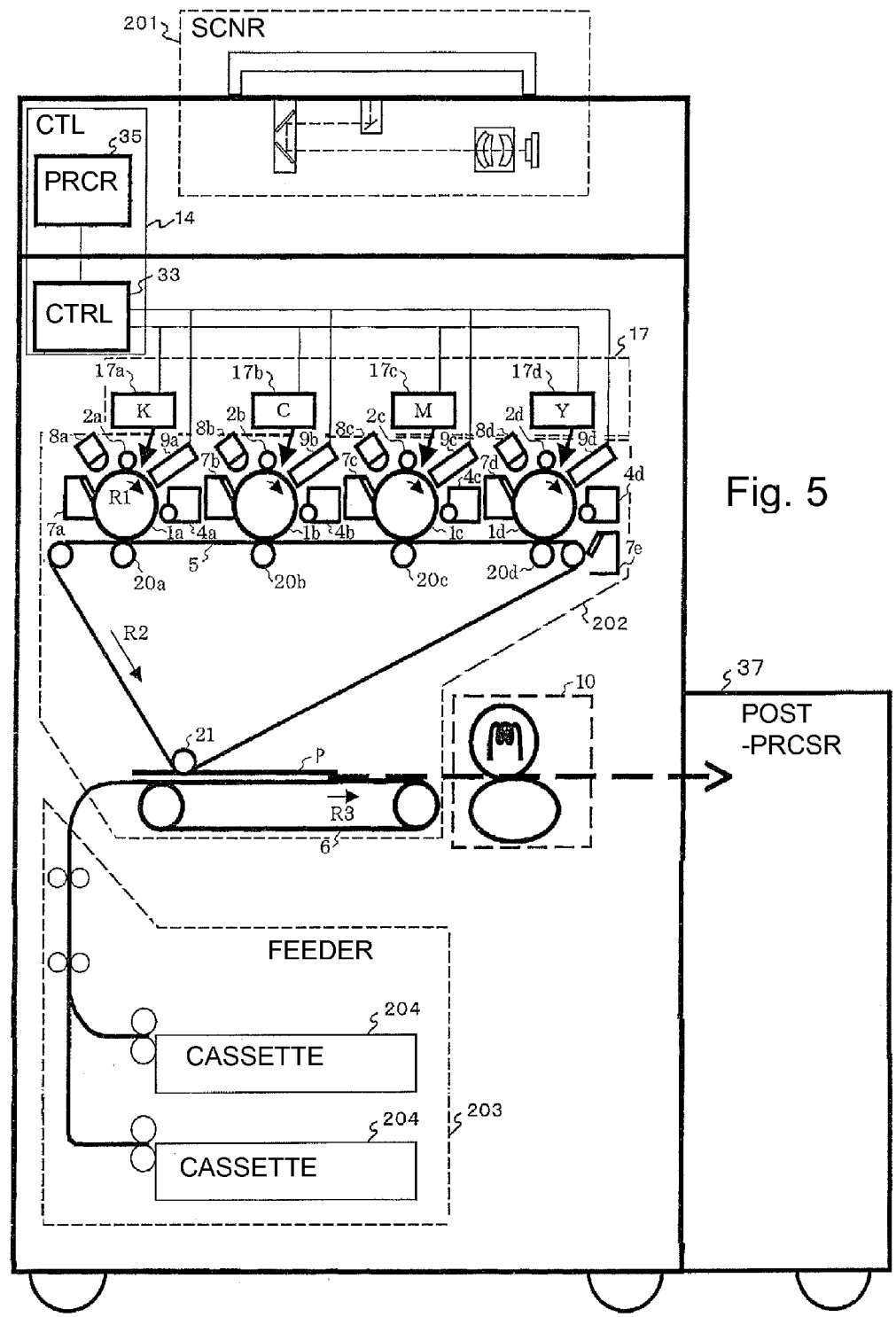
FIG. 5 is a schematic sectional view of the image forming apparatus in the first and second preferred embodiments of the present invention.

Next, referring to FIG. 5, the structure of a multifunction 4D color image forming apparatus, that is, an example of a multifunction image forming apparatus, will be described. FIG. 5 is a drawing which shows the structure of the multifunction 4D color image forming apparatus 16 in this embodiment. The multifunction 4D color image forming apparatus 16 in this drawing is an electrophotographic image forming apparatus. The drawing is a schematic vertical sectional view of the apparatus, which shows the general structure of the main portions of the apparatus. The multifunction 4D color image forming apparatus 16 has a scanner portion 201, an exposing portion 17 (based on laser), an image forming portion 202, a fixing apparatus 10, a sheet feeding-and-conveying portion 203, a post-processing portion 37, and a controlling portion 14 (which hereafter will be referred to simply as controller 14) for controlling the preceding portions. The scanner portion 201 generates image data by illuminating the original on its original placement plate, optically reading the original, and converting the image of the original into electrical signals. The exposing portion 17 scans the peripheral surface of a photosensitive drum 1 with the beam of laser light, which it emits, by projecting the beam of laser light upon its polygonal mirror, which is being rotated at a constant angular velocity, while modulating the beam of light with the image data (electrical signals).

The image forming portion 202 has four electrophotographic development units (station) which are in a sequential arrangement. That is, the image forming portion 202 has yellow (Y), magenta (M), cyan (c), and black (K) color development units (stations) and four transferring means. It forms multicolor images with the use of four recording materials (for example, four toners) different in color. Each station has an electrophotographic photosensitive member 1 (which hereafter will be referred to as photosensitive drum) as an image bearing member. The photosensitive drum 1 is supported in such a manner that it can be rotated in the direction indicated by an arrow mark R1. Each station has also a first charging device 2 (charging means), the exposing portion 17 (exposing means which uses a laser), a potential level sensor 9, a developing apparatus 4 (developing means), a cleaning apparatus 7 (cleaning means), and a pre-exposing device 8 (pre-exposing means), which are in the adjacencies of the peripheral surface of the photosensitive drum 1, being arranged in the listed order. The image forming portion 202 has also an internal transferring unit 5 (transferring means), which rotates in the direction indicated by an arrow mark R2, and an external transfer belt 6 (transferring means), which rotates in the direction indicated by an arrow mark R3. The internal transferring unit 5 is in contact with the photosensitive drum 1 of each station, at the first transfer portion 20. The external transfer belt 6 is in contact with the internal transfer unit 5 at the second transfer portion 22, through which sheets of recording medium are conveyed. The fixing apparatus 10 has a fixation roller and a pressure belt, and is on the downstream side of the second transfer portion 21 (through which recording medium is conveyed by the external transfer belt 6), in terms of the recording medium conveyance direction. Designated by a referential code 7e is a cleaning apparatus for cleaning the internal transfer unit 5. Incidentally, suffixes "a, b, c, and d" in the drawings are referential codes which correspond to black (K), cyan (C), magenta (M), and yellow (Y). Hereafter, the suffixes "a, b, c, and d" may be sometimes dropped.

As an image forming operation is started by the above described multicolor 4D color image forming apparatus, the photosensitive drum 1 is rotated in the direction indicated by the arrow mark R1 at a preset process speed. As the photosensitive drum 1 is rotated, the peripheral surface of the photosensitive drum 1 is roughly uniformly charged to preset polarity and potential level by the first charging device 2. The charged portion of the peripheral surface of the photosensitive drum 1 is scanned by the beam of laser light projected by the exposing portion 17 while being modulated with the image formation signals sent from the controller 33 of the multifunction image forming apparatus after being subjected to processes such as tone correction in the output image data processing portion 35 which uses yLUT. The exposing portion 17 projects a beam of laser light from its internal laser chip, while modulating in intensity the beam of laser light with the instruction sent from the output image data processing portion 35. As a given point of the charged portion of the peripheral surface of the photosensitive drum 1 is exposed to the beam of laser light from the exposing portion 17, the electric charge given to this point by the uniform charging of the peripheral surface of the photosensitive drum 1 is removed. Thus, as the charged portion of the peripheral surface of the photosensitive drum 1 is scanned by the beam of laser light projected by the exposing portion 17, an electrostatic latent image is effected on the charged portion of the peripheral surface of the photosensitive drum 1. To this electrostatic latent image, toner (developer) is adhered to develop the latent image into a visible image, that is, an image formed of toner (developer). More specifically, as a preset bias is applied to the development sleeve, which is a developer bearing member in the developing apparatus 4, the toner on the development sleeve jumps onto the peripheral surface of the photosensitive drum 1, and adheres to the points of the charged portion of the photosensitive drum 1, from which electric charge was removed by the exposure, developing thereby the latent image into a visible image (image formed of toner, which hereafter will be referred to as toner image). The toner image, that is, the developed latent image, is transferred from the photosensitive drum 1 onto the internal transfer unit 5 in the first transfer portion 20. The above described image formation sequence is sequentially carried out in the yellow (Y), magenta (M), cyan (C), and black (K), arranged in the listed order, with preset intervals after the starting of the image formation sequence in the yellow development unit. The print control portion 14 controls the timing with which the image formation sequence is carried out in each station. Consequently, four monochromatic toner images, different in color, are transferred in layers, with perfect alignment, effecting thereby a full-color toner image with no color deviation, on the internal transfer unit 5. Then, this full-color toner image is transferred onto a sheet of recording means, in the second transfer portion 21. Then, the full-color toner image on the recording medium P is fixed to the recording medium P by the heat and pressure applied to the recording medium P and the full-color toner image thereon by the fixing apparatus 10.

The sheet feeding-and-conveying portion 203 has one or more recording sheet storing portions 204, for example, a recording sheet cassette, a paper deck, and the like. The sheet feeding-and-conveying portion 203 feeds one of the multiple sheets of recording medium in the recording medium sheet storing portions, into the main assembly of the image forming apparatus, while separating it from the rest, and sends the sheet of recording medium to the image forming portion 202. As the sheet P is conveyed through the main assembly of the image forming apparatus, monochromatic toner images, different in color, are transferred onto the sheet P by the above-described image forming portion 202, a full-color toner image is formed as the final image on the sheet P. The printer control portion 14 communicates with the controller 33, which controls the entirety of the multifunction image forming apparatus, and controls the printing portion 36 in response to the instructions from the controller 13. In addition, it controls the scanner portion 201, exposing portion 17, image forming portion 202, fixing apparatus 10, and sheet feeding-and-conveying portion 203, so that they smoothly operate in harmony, while examining their conditions.

[Flow of Overall Exposure Amount Correcting Process]

Next, the very portion of the image forming operation, to which the present invention relates, will be described. The laser-based exposing portion 17 scans the charged portion of the peripheral surface of the photosensitive drum 1 with the beam of laser light which it emits while modulating the beam of laser light with the image formation signals sent from the controller 33 of the multifunction image forming apparatus after being subjected to processes such as a tone correction process carried out in the output image data processing portion 35 with reference to yLUT. Here, the above-described controller 33 of the multifunction image forming apparatus and the output image data processing portion 35 are described as the printer control portion 14. The exposing portion 17 is a laser-based exposing apparatus which is adjustable in exposure amount in response to the instruction from the printer control portion 14. The printer control portion 14 has a computing apparatus for calculating the proper amount of exposure for a given pixel, in relation to the amount of exposure for the adjacent pixels, with the use of a filter. The filter is a 3×3 dot matrix filter, and has an individual exposure correction matrix portion and an overall exposure amount correction matrix portion (which is fourth dimensional color correction matrix portion in this embodiment).

Figure 6:
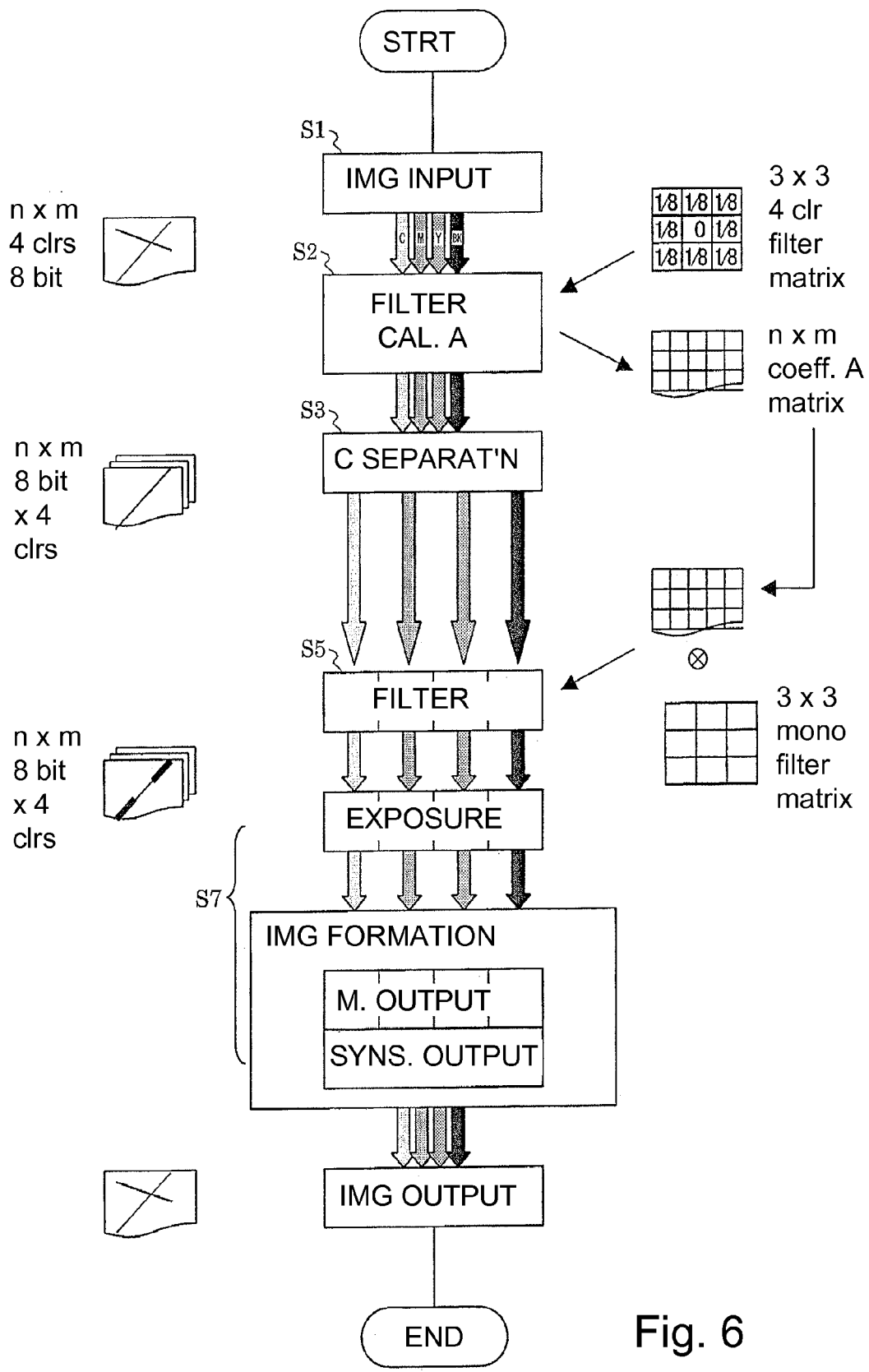
FIG. 6 is a drawing for describing the concept of the process for correcting the amount by which a given point of the image bearing member, which corresponds to the actual image portion of an original, is to be exposed by the image forming apparatus in the first embodiment of the present invention.
Figure 7:
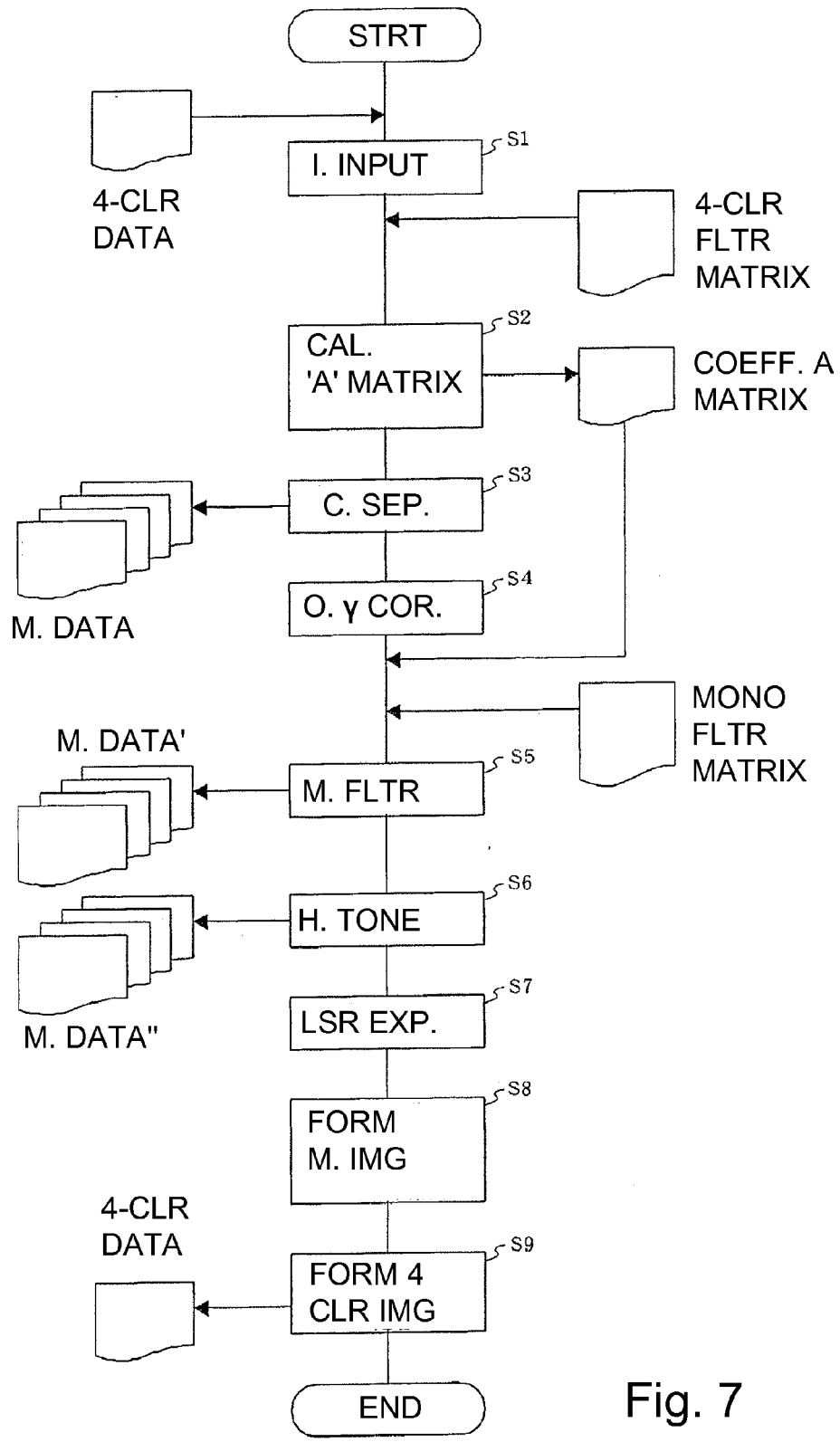
FIG. 7 is a flowchart of the sequence for correcting the amount by which a given point of the image bearing member of the image forming apparatus in the first embodiment is to be exposed.

Next, how the printer control portion 14 calculates the correct amount of exposure will be described. The amount by which a given portion of the image bearing member, which corresponds to a pixel, is to be exposed is calculated though the following steps. The concept of this process is shown in FIG. 6, and the flow of the process is shown in FIG. 7. The step numbers in FIG. 6 correspond one for one to the step numbers of the flowchart shown in FIG. 7 which the CPU of the printer control portion 14 shown in FIG. 7 follows. The arrow marks between the consecutive two steps correspond one for one to the image data for the monochromatic images of C, M, Y, and K (BK) colors.

In Step 1 (which hereafter may be abbreviated as S1), a set of image data (8 bit) for four monochromatic images, which corresponds to n×m pixels, is inputted by a user. In S2, the overall exposure amount correcting portion 63 calculates the amount of difference between a given pixel and adjacent pixels of the original image data (for four monochromatic images) with the use of the overall exposure amount correction matrix filter. Then, it calculates the overall exposure amount correction amount (coefficient A of correction). This sequence is repeated to form and store a correction coefficient A matrix for the image data for n×m pixels. The overall exposure amount correction matrix filter, which the overall exposure amount correction portion 63 uses for correction, calculates so that the greater the amount by which toner is to be adhered to a given pixel, the smaller the calculated coefficient. More concretely, a 3×3 dot filter, whose value for a target pixel is 0, and whose value for the pixels adjacent to the target pixel is 1, is positioned so that the center of the filter coincides with the target pixel. Then, the image data is multiplied by the filter. Then, the average of the obtained products is calculated. That is, in this embodiment, the sum of the obtained products is divided by eight. Then, the difference in value between the target pixel and the average value is calculated. The thus obtained value is the correction coefficient A for the target pixel. This process is repeated n×m times, obtaining thereby the coefficient A matrix.

In S3, the original image data is separated into four monochromatic image data by the monochromatic exposure amount correcting portion 64. In S4, each of the monochromatic image data obtained through the color separation in S3 is subjected to the output gamma correction, that is, density correction, by the output gamma correcting portion 61. In S5, the monochromatic exposure amount correcting portion 64 generates an exposure amount data matrix (n×m pixels) by folding the overall exposure amount correction coefficient A matrix, which was calculated and stored in S2, into the individual exposure amount correction matrix (3×3 pixels). The individual exposure amount filter is set for the improvement in the reproduction of small dots and fine lines. The individual exposure amount correcting portion 64 computes "monochromatic (individual) matrix filter×coefficient A matrix" for each pixel of the source data (first image data), so that if the amount by which toner will be adhered to a given pixel as multiple monochromatic images are layered on the internal transfer unit 5 is excessive relative to the amount by which toner will be adhered to the adjacent pixels, the correction is made to reduce the amount by which toner is adhered per monochromatic image, whereas if it is not excessive, correction is made without reducing the amount by which the amount by which toner is adhered to form each monochromatic image. The amount of exposure for the formation of each monochromatic image is 160% at maximum relative to the source image data. If some area of the peripheral surface of the image bearing member, which correspond to the multicolor areas of the source (original) image, will be excessive in the amount by which toner will be adhered thereto, the amount of exposure for these areas is reduced by 25% or less after the completion of the exposure amount correction for the formation of each monochromatic image (individual exposure amount correction). In S6, the halftone processing portion carries out the halftone process. In S7, the laser-based exposing portion 17 exposes the peripheral surface of each photosensitive drum 1 in the pattern of an intended image, based on the exposure amount data matrix. In S8, monochromatic images are formed following the above-described method. In S9, the four monochromatic images, different in color, are transferred onto the internal transfer unit 5, whereby a full-color image is synthetically effected on the internal transfer unit 5; the full-color image is transferred onto a sheet P of recording medium; and the full-color image is fixed to the sheet P of recording medium.

Figure 8:
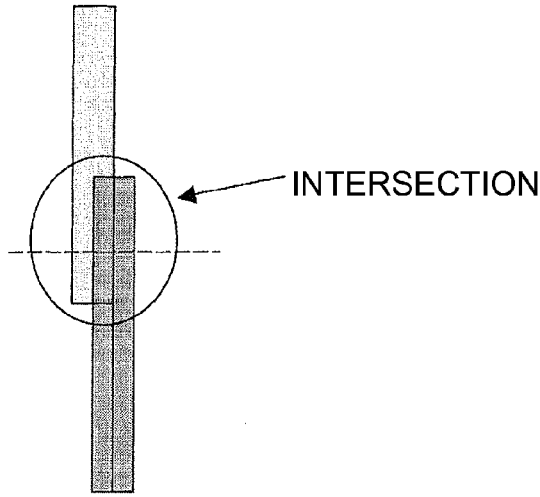
In FIG. 8, (a)-(c) are schematic vertical sectional views of an area of a multicolor image, where a monochromatic line formed of toner overlaps with another monochromatic line made of toner different in color from the first toner, and is for describing the difference between the conventional method for correcting the amount by which a given point of the image bearing member is to be exposed, and the corresponding method in this embodiment.
Figure 8:
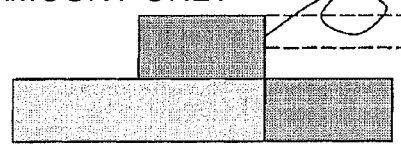
Figure 8:
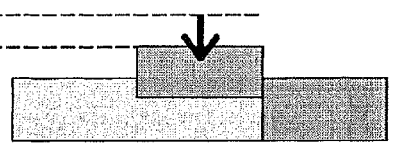
Figure 8:
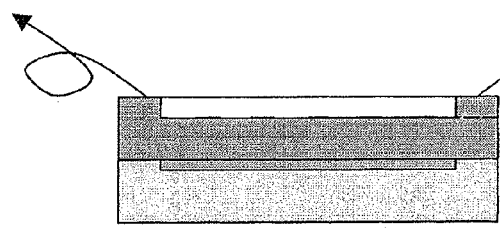
Figure 8:
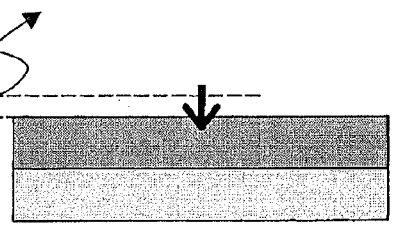
Figure 13:
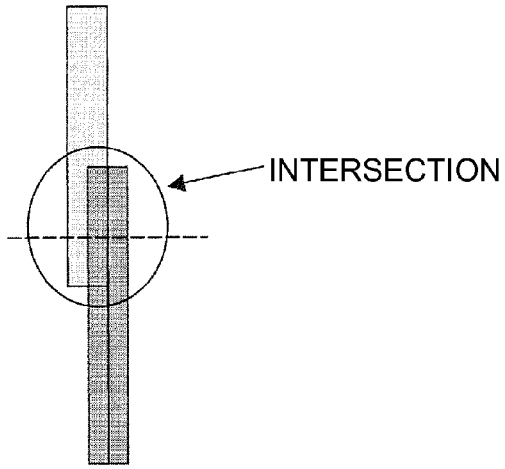
In FIG. 13, (a)-13 (d) are drawings for describing the conventional method for correcting the amount by which a given point of the image bearing member of an image forming apparatus is exposed.
Figure 13:
Figure 13:
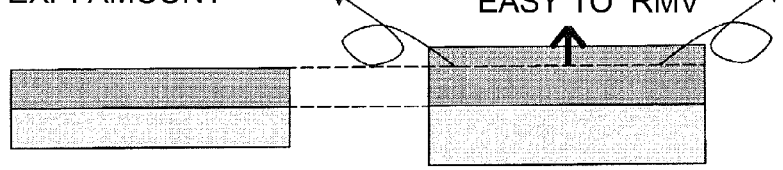
Figure 13:
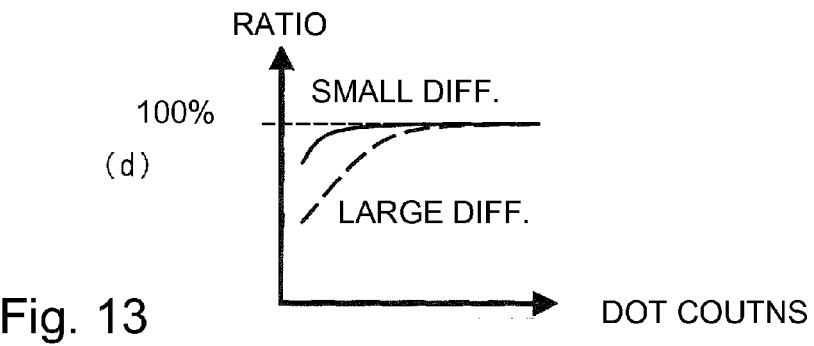

Thus, unlike the case in which correction is made with the use of the conventional method shown in FIG. 13, that is, the case in which correction is made only for the formation of each monochromatic image, the amount by which toner will be adhered to the portion of the peripheral surface of the photosensitive drum 1, which corresponds to the intersection of a pair of fine lines, shown in FIG. 8(a), of the image to be formed, is not excessively increased. Therefore, it does not occur that toner peels away from the portion of the sheet P of recording medium, which corresponds to the above-mentioned intersection, in the second transfer portion 21 and fixing apparatus 10. To look at this intersection in FIG. 8(b), which is an enlarged sectional view of the intersection at the plane indicated by dotted line in FIG. 8(a), the amount (8(b)(ii)) by which toner is adhered to the peripheral surface of the photosensitive drum 1 when the overall exposure amount correction, that is, the correction in this embodiment, is used, is smaller than that (FIG. 8(b)(i)) when the individual exposure amount correction alone is used. Therefore, when the exposure amount correction method in this embodiment is used, toner is less likely to peel away than when the individual exposure amount correcting method alone is used. Further, referring to FIG. 8(c), also in the case of the overlapping of a pair of relatively thick lines, the amount (FIG. 8(c)(ii)) by which toner is adhered to the peripheral surface of the photosensitive drum 1 when the overall exposure amount correcting method in this embodiment is used is smaller than that (FIG. 8(c)(i)) when the individual exposure amount correcting method alone is used. Therefore, toner is less likely to peel when the overall exposure amount correcting method in this embodiment is used than when the individual exposure amount correcting method alone is used.

[Example of Actual Calculation]

The series of calculation performed on the inputted source image date will be more concretely described. Here, for the simplification of description, the series of calculation will be described with reference to an image made up of two monochromatic images, that is, cyan and magenta monochromatic images. It is assumed that the inputted image data is as shown in Table 1 of FIG. 14. Each cell of Table 1 corresponds to a single pixel, and the numerical value in each cell is the value of the corresponding image signal.

In Table 1, "1" corresponds to the amount by which toner is adhered for the formation of a solid monochromatic image. Thus, "2" means the amount is 200% of the amount by which toner is adhered for the formation of a solid monochromatic image. If it is assumed that an image is formed of cyan and magenta toners, Table 1 can be separated into Table 2 of FIG. 14.

If each monochromatic image is outputted without correction as it has been conventionally, the actual amount by which toner will be adhered to the peripheral surface of the photosensitive drum 1 will be as shown in Table 3 of FIG. 14;

In this embodiment, therefore, whether or not dots will be present in the adjacencies of the target pixel is checked by the convolutional integration of the matrix filter shown in Table 4 of FIG. 14 and monochromatic image data shown in Table 2. Then, each image signal which correspond to an isolated dot is increased.

The maximum amount of correction for a monochromatic image data was set to 60% (source image signal was lengthened by as much as 60%), and the amount of correction was calculated by applying the matrix in Table 4 to the image signals in Table 2. The results are in Table 5 of FIG. 15.

If the two images formed by adhering toner to the peripheral surface of the photosensitive drum 1 by the amount shown in Table 5, the amount by which toner is adhered to the second transfer portion 21 will be as shown in Table 6 of FIG. 15.

Without correction, there is the maximum difference of 1.33 (=2.53-1.20 (area surrounded by bold line)) in signal length between the pixel of primary color and the pixel of secondary color. In other words, the amount of exposure will be greater by 0.33 times compared to the value of which the amount of exposure will be if the conventional method is used. Therefore, the difference, in the thickness of toner layer, between an area of an image, which will be of the primary color, and an area of the image, which will be of the secondary color, will be substantial. Therefore, toner will be likely to separate from some portions of the medium after its transfer onto the medium. As a means for preventing the above described problem from occurring, first, the location of the areas which will have the secondary color are found and stored. The found locations are shown in Table 7 of FIG. 15. The areas having "1" are those which will have the secondary color.

Then, the average value for the pixels which are adjacent to the target pixel is obtained by applying the secondary color filter matrix shown in Table 8 of FIG. 15 to the data of the inputted source image. Then, the amount of difference between the value of the target pixel and the average value of the adjacent pixels is obtained.

The obtained differences are shown in Table 9 of FIG. 16.

This time, the amount by which the exposure signal corresponding to the areas which will have the secondary color was to be corrected was set to 25% (maximum amount by which exposure signal value is reduced is 25% of corrected amount of exposure signal for area of primary color). The results of the correction made to only the exposure signals corresponding to the cells in Table 5, which were determined to be the cells which will be of the secondary color as shown in Table 7 are shown in Table 10 of FIG. 16.

If the two images formed with use of the above described correction method are layered, the resultant images will appear as shown in Table 11 of FIG. 16.

That is, when only the correcting method which corrected the exposure signals corresponding to the areas which would be of the primary color was used, the difference in thickness between the toner layer corresponding to the primary color, and the toner layer corresponding to the secondary color, was 1.33, whereas when the correcting method in this embodiment was used, it was 0.75, which was substantially less than when the conventional correcting method was used. Therefore, images made using the correcting method in this embodiment were superior in terms of toner peeling. Further, before the exposure signals which correspond to the lines (area surrounded by solid line in Table 10) of the source image, which is of the primary color, were corrected, they were 1.0 in value. However, after the correction made with the use of the correcting method in this embodiment, they became 1.20 in value, which is substantially higher. Thus, the multifunction full-color image forming apparatus is improved in the reproducibility of fine lines of the primary color.

Similarly, the image data shown in Table 12 of FIG. 16 was inputted.

The results are in Table 13 of FIG. 17.

As will be evident from Table 13, when correction was not made to the exposure signals corresponding to the areas of the source image, which are of the secondary color, the image signals (exposure signals) corresponding to the edge portions of the secondary color area become excessive in value, and therefore, toner layers is more likely to crumble compared to when correction is made with the use of the conventional method. However, making correction to the exposure signal (image signals) corresponding to the areas of the secondary color as in this embodiment can keep the amount of exposure as low as the conventional correction method can. Therefore, the images which will be outputted by the combination of the multicolor image forming apparatus and image forming method in this embodiment will be no less in quality than those made by a combination of a conventional multifunction image forming apparatus and image forming method.

As will be evident from the above given description of this embodiment, according to the present invention, not only is correction made to the image formation signals for the formation of the primary color areas of an intended image, as it is by the conventional image forming method, but also, to the image formation signals for the formation of the secondary color areas of the image. Therefore, toner is unlikely to peel from some portions of the secondary color areas of the image, and fine lines of the image are excellently reproduced. Further, toner layer is less likely to crumble along the edge portions of bold lines, and toner is less likely to peel at steps step between given two areas of an image, which are different in the number of toner layers, and therefore, even fine lines, which will be made up of two or more layers of toner, will be excellently reproduced. Further, each of the processes for correcting exposure amount can be carried out independently from the other processes. Further, the correction corresponding to primary color areas of an image can be independently carried out from the correction corresponding to secondary color areas of the image. Further, the amount of exposure can be corrected in an optically proper range, in each process. Further, it is possible to prevent the problem that toner peels from a given point (area) of an image bearing medium, which corresponds in size to a single pixel, in a case where the given point is significantly greater, in the amount by which toner is adhered thereto, than the adjacent points.

Embodiment 2

In this embodiment, an exposure amount correction filter, which is equivalent in size to 5×5 dots (pixels), is used to correct exposure amount. What will be described next in detail is the portion of the exposure amount correcting method in this embodiment, which is carried out after the halftoning. The portions of the structure of the image forming apparatus, their effects, etc, which will not be described, are the same as those in the first embodiment.

[Structure of Image Data Processing Portion]

Figure 9:
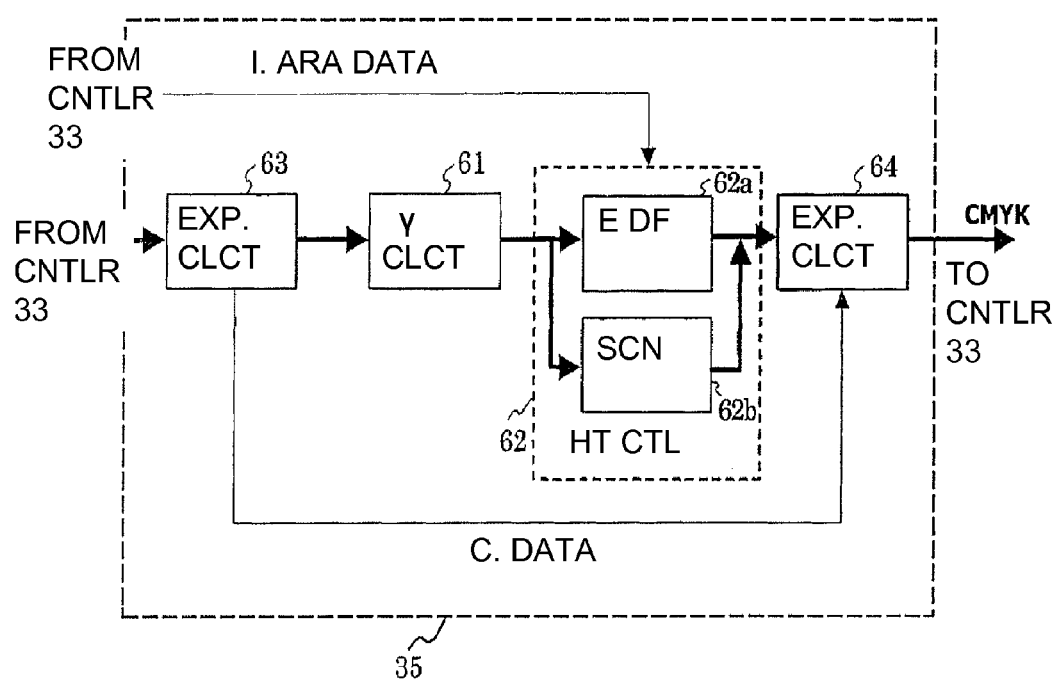
FIG. 9 is a block diagram of the image processing portion in the second preferred embodiment of the present invention, and depicts the structure of the processing portion.

Next, referring to FIG. 9, the image data processing portion in this embodiment will be described. This embodiment is different from the first embodiment in that the first portion to which the image data is outputted after being corrected in density by the gamma correcting portion 61 is the halftoning portion 62. The halftoning portion 62 in this embodiment has an error dispersing portion 62 which processes the image data with the use of an error dispersion screen, and a multi-value screening portion 62 which processes the image data with the use of a multi-value screen, as does the halftoning portion in the first embodiment. In this embodiment, after the image data is processed by the halftoning portion 62, it is outputted to a single exposure amount correcting portion 64.

Figure 10:
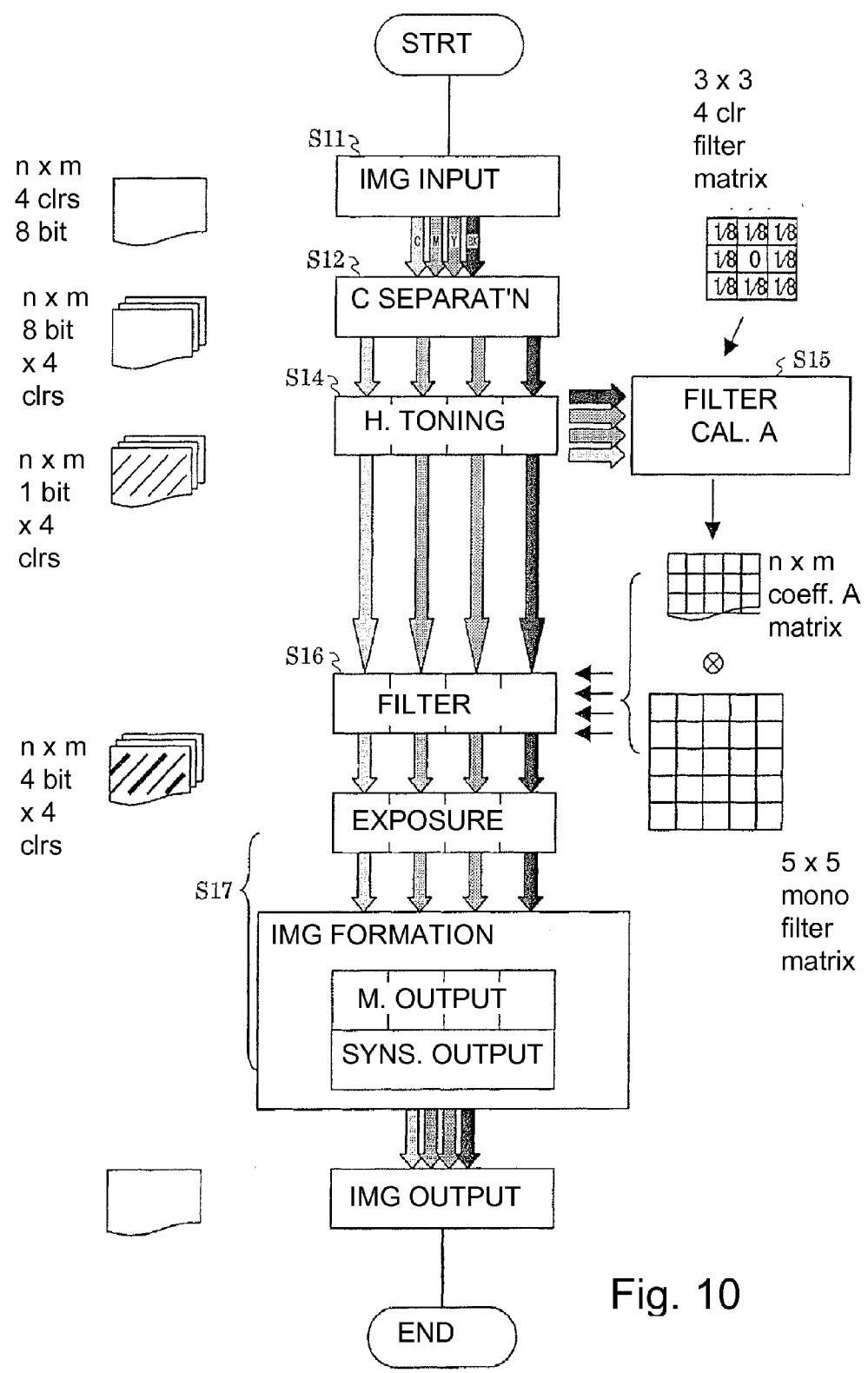
FIG. 10 is a schematic drawing for describing the concept of the process for correcting the amount by which a given point of the image bearing member, which corresponds to the actual image portion of an original (or image to be formed), is exposed by the image forming apparatus in the second embodiment of the present invention.
Figure 11:
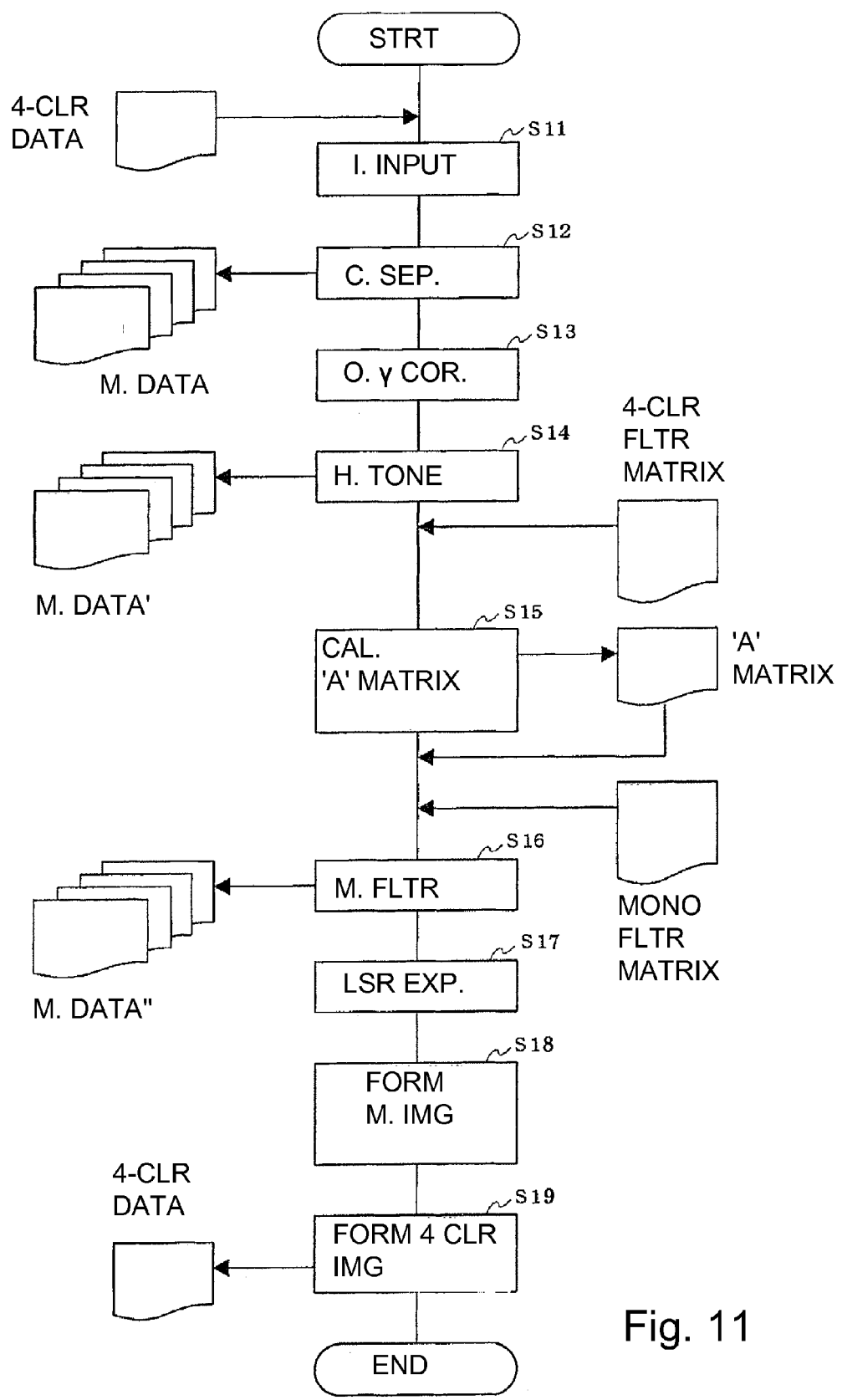
FIG. 11 is a flowchart of the sequence for correcting the amount by which a given point of the image bearing member of the image forming apparatus in the second embodiment is to be exposed.
Figure 12:
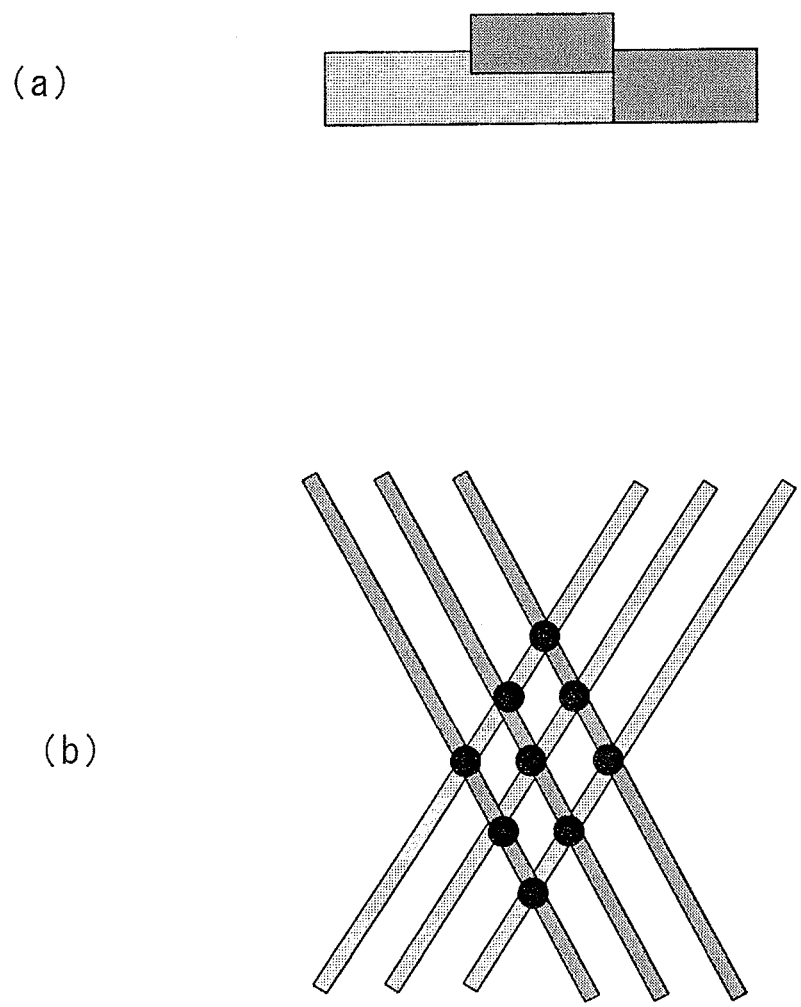
In FIG. 12, (a) and (b) are sectional and plan views, respectively, of the image formed using the image forming apparatus and image forming method in the second preferred embodiment of the present invention.

The amount by which a given point (area) of the image bearing member, which corresponds in size to a single pixel, is exposed is calculated through the following steps (FIG. 10 which shows concept; FIG. 11 which is flow chart). The step numbers in FIG. 10 which shows the concept of this embodiment correspond to the step numbers of the flowchart in FIG. 11.

In S11, an 8-bit image data, which correspond in size to n×m pixels, is inputted by a user. In S12, the source data of the image formed of four primary colors is separated into four data which correspond to four primary colors one for one. In S13, the gamma correcting portion 61 corrects, in gamma, each of four data which correspond to four primary colors. In S14, the halftoning portion 62 "halftones" each of the four data (8 bit). In S15, the image data "halftoned" by the halftoning portion 62 is temporarily synthesized and extended to 4 bit. Then, the difference between the amount of exposure for a given point (equivalent to single pixel) of the source image (made up of four primary color) and the average amount of exposure for the adjacent points (pixels), is calculated with the use of the filter matrix for four primary color, which is equivalent in size to 3×3 pixels. Then, the amount by which the overall amount of exposure is to be corrected is calculated from the difference. Then, the matrix of coefficient A of correction, which is equivalent in size to n×m pixels is created and stored.

The overall exposure amount correction filter is created in such a manner that the greater the amount by which the amount by which toner will be adhered to a given point (pixel) is greater than the amount by which toner will be adhered to the adjacent points (pixels), the smaller the coefficient. As the individual exposure amount correction matrix filter, the matrix filter shown in Table 14 of FIG. 17 is used.

The filter shown in Table 14 is equivalent in size to 5×5 pixels. The cell of the table, which corresponds to a target point (pixel), is 1 in value, whereas the adjacent cells are set to 0.5 in value to reflect the distance from the target point. The filter is aligned with the image formation data so that the center cell of the filter coincides with the target point (pixel). Then, the product between the value in each cell of the filter and the value of the corresponding pixel is obtained for all the cells of the filter. Then, the products are totaled, and averaged. Then, the difference between the value for the target point (pixel) and the average value for the adjacent points (pixels) is calculated, obtaining thereby a coefficient A of correction for the target point (pixel). This process is repeated for all the points which correspond to n×m pixels, to create a matrix of coefficient A of correction.

In S15, an exposure amount data matrix which corresponds in size to n×m pixels is created by the convolutional integration of the halftoned monochromatic image data and the correction coefficient A matrix calculated and stored in S13. The filter for monochromatic image formation is created so that it will improve an image forming apparatus in the reproduction of small dots and fine lines. In S16, the image data is processed by the individual exposure amount correcting portion 64 with the use of the monochromatic image formation filter. In S17, each image bearing member is exposed based on the corresponding exposure amount data matrix, and in S18, monochromatic images are formed with the use of the above described method. In S19, the monochromatic images are transferred onto a sheet of recording medium, on which they are synthesized into a multicolor image.

As described above, the exposure amount correcting method in this embodiment is superior to that in the first embodiment, in terms of the reproduction of lines bolder than the bold lines which were excellently reproduced with the use of the exposure amount correcting method in the first embodiment. Further, the exposure amount correcting method in this embodiment is different from the conventional method which corrects exposure amount only for the primary color portions of an image, in that it does not extremely increase even the amount by which toner is adhered to the intersection (indicated by round black circle) between two halftoned fine lines. Therefore, toner does not peel in the second transfer portion 21 and fixing apparatus 10. Thus, the images which are outputted with the use of the exposure amount correcting method in this embodiment will be macroscopically less coarse than those formed with the use of the conventional exposure amount correcting method. Further, it prevents the problem that the intersections among the monochromatic image layers become coarse in appearance because of the peeling of toner therefrom. Further, the exposure amount correcting method in this embodiment makes it possible to correct exposure amount in an optimal range, in each process, and also, to prevent the problem that toner is likely to peel from a given point of an image (sheet of recording medium) in a case where the amount by which toner was adhered to the give point is greater than the amount by which toner was adhered to the adjacent points.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 215544/2009 filed Sep. 17, 2009 which is hereby incorporated by reference.

What is claimed is:

1. An image forming apparatus comprising:
   an exposure device that exposes an image bearing member to light in accordance with monochromatic image data provided by color separation of inputted multi-color image data to form an electrostatic latent image;
   a control unit that calculates an exposure amount of each pixel of the monochromatic image data to expose the image bearing member with the calculated exposure amount;
   wherein said control unit includes a monochromatic correcting unit that calculates a correction amount in accordance with a pixel value of a pixel around a target pixel of the monochromatic image data to correct an exposure amount of the target pixel on the basis of the calculated amount;
   wherein said control unit includes a multi-color correcting unit that provides a coefficient for correction of the exposure amount on the basis of the multi-color image data;
   wherein said monochromatic correcting unit controls the exposure amount using the coefficient and the correction amount provided by said multi-color correcting unit.

2. The apparatus according to claim 1, wherein said multi-color correcting unit provides a coefficient of a target pixel from a pixel value of a pixel around the target pixel of the multi-color image data.

3. The apparatus according to claim 2, wherein said multi-color correcting unit obtains an average of pixel values around the target pixel of the multi-color image data, and provides the coefficient on the basis of a difference between the average and the pixel value of the target pixel.

4. The apparatus according to claim 1, wherein said monochromatic correcting unit makes the correction to the monochromatic image data having been subjected to a half-tone process.

5. An image forming method comprising:
   an exposure step of exposing an image bearing member to light in accordance with monochromatic image data provided by color separation of inputted multi-color image data to form an electrostatic latent image;
   a control step of calculating an exposure amount of each pixel of the monochromatic image data to expose the image bearing member with the calculated exposure amount;
   wherein said control step includes a monochromatic correcting step of calculating a correction amount in accordance with a pixel value of a pixel around a target pixel of the monochromatic image data to correct an exposure amount of the target pixel on the basis of the calculated amount;
   wherein said control step includes multi-color correcting step of providing a coefficient for correction of the exposure amount on the basis of the multi-color image data;
   wherein said monochromatic correcting step controls the exposure amount using the coefficient and the correction amount provided by said multi-color correcting step.

6. The method according to claim 5, wherein said multi-color correcting step provides a coefficient of a target pixel from a pixel value of a pixel around the target pixel of the multi-color image data.

7. The method according to claim 6, wherein said multi-color correcting step obtains an average of pixel values around the target pixel of the multi-color image data, and provides the coefficient on the basis of a difference between the average and the pixel value of the target pixel.

8. The method according to claim 5, wherein said monochromatic correcting step makes the correction to the monochromatic image data having been subjected to half-tone process.

* * * * *